United States Patent Office 2,702,282
Patented Feb. 15, 1955

2,702,282

PROCESS FOR INHIBITING THE DETERIORATION OF COATING COMPOSITION OVERSPRAY

John E. Shamp, Perrysburg, Ohio, assignor to E. I. du Pont de Nemours and Company, Wilmington, Del., a corporation of Delaware No Drawing. Application June 5, 1951,
Serial No. 230,071

5 Claims. (Cl. 260—2.3)

This invention relates to improved processes for recovering sprayed organic coating compositions. More particularly, this invention relates to a method of inhibiting the deterioration of accumulated quantities of the spray dust or overspray of sprayed organic coating compositions, which deterioration occurs during the interval between spraying and the final steps of reprocessing the collected material into a usable coating composition.

In the spray application of paint, varnish, lacquer and the like some of the atomized coating composition is not deposited on the article being coated. This so-called "spray dust" or "overspray" is carried away by air in the spraying system and in many instances wasted. Since the overspray contains valuable organic binder or film-former (such as vegetable oils, synthetic resins, cellulose derivatives, plasticizers, and the like) along with some solvents and/or diluents, and pigment if such is present in the product being sprayed; it is customary for large users of sprayed coatings to collect the overspray for subsequent reprocessing into usable coating compositions. Overspray is usually collected by passing the discharged air from a spraying operation through a water curtain and/or water spray system which entraps or precipitates the sprayed particles and carries them to a collecting reservoir. The water usually contains an additive which aids in causing the particles to coagulate or agglomerate into a layer which is relatively easily separable from the bulk of the aqueous precipitating medium. This layer which is called "sludge" is removed from time to time and is usually packaged in drums for transportation to the recovery plant. The sludge contains the above-mentioned valuable constituents and a large proportion of undesirable occluded water or aqueous precipitating medium.

The conventional reclamation processes involve removing substantially all of the water or aqueous precipitating medium by decantation, centrifugation, azeotropic distillation, and the like. In some cases the water-containing sludge is converted into an oil-in-water type of emulsion paint by adding an emulsifying agent, solvent or diluent, and more water if necessary. However, whatever the method of reclamation, if the overspray is to be converted into a usable coating composition having good protective or decorative properties as compared to the coating composition from which it was derived, the reclamation process must be carried out while the collected overspray is still completely soluble in a solvent of the same general character as the solvent in the original coating composition. For reasons which have not been completely investigated and established, overspray sludge deteriorates ultimately to a condition in which it is impossible or prohibitively expensive to reclaim, or from which it is impossible or prohibitively expensive to obtain a reclaimed product having protective or decorative properties substantially equal to those of the coating composition from which it was derived.

The rate of this deterioration appears to depend in part upon the nature and constituents of the sprayed coating composition, the conditions under which it was sprayed and the overspray was collected, the time elapsed between spraying and reclamation, and the storage conditions during that period. Prolonged exposure to high temperatures, as would be encountered in storing the sludge-containing drums in the summer sun in a recovery plant yard, appears to promote deterioration faster than any other factor. The usable overspray portion of the sludge, even under the best of the above-mentioned conditions, progressively and gradually deteriorates from its original state, in which it is still soluble in its original kind of solvent, to a thickened state containing discrete insoluble particles commonly called "seed" or to a soft gel having limited solubility, and finally to a semi-solid gel having substantially no solubility in the kind of solvent used in the original composition. Once the stored sludge has deteriorated to the seedy or soft gel stage, or further to the semi-solid gel stage, it cannot be economically reconditioned and must be disposed of as waste or as a coating composition of markedly inferior quality in which poor durability or poor appearance are not objectionable.

An example of reprocessing to obtain a coating composition having protective or decorative properties substantially equal to the original coating composition is the production of a white synthetic enamel top coat for steel cabinets from the undeteriorated overspray of a new white synthetic enamel for the same purpose. The reprocessed material is usable alone as a high quality product, or it may be blended in any proportion with new enamel having substantially the same composition.

An example of the partial loss involved in reprocessing overspray sludge to obtain a coating composition having slightly inferior properties is the production, from the partially deteriorated overspray of a first quality white synthetic enamel top coat, of a second-quality white synthetic enamel top coat for cheaper steel cabinets on which the finish is not expected to yield the durability or appearance of a top quality product.

An example of the even greater loss involved in reprocessing overspray sludge to obtain a markedly inferior coating composition is the production, from the gelled overspray of a first-quality white synthetic enamel top coat, of a third-quality "cheap" general purpose paint which is useful only for the short term protection or decoration of such surfaces as temporary industrial buildings, fences, structures and equipment requiring continual repainting, and the like.

Thus the processors of overspray sludge have the ever-present alternate of reprocessing the sludge quickly to use it while it is in good condition or to take the losses involved in permitting the sludge to deteriorate.

The principal object of this invention is to provide a reclamation process for coating composition overspray sludge whereby the valuable constituents thereof can be reprocessed after prolonged storage under adverse conditions into a coating composition having properties substantially equal and not markedly inferior to the coating composition from which the overspray was derived.

Another object of this invention is to provide a process for treating collected overspray sludge to keep it in its original soluble state, whereby it can be reprocessed into a coating composition having susbtantially the protective and decorative properties of the original composition from which the overspray was derived and whereby the reprocessing can be done at a time substantially later than when the same sludge, without treatment, would have deteriorated to an unusable condition for the same purpose.

A further object is to provide an inhibitory or preservative treatment for coating composition overspray sludge whereby storage without excessive deterioration can be lengthened materially and whereby the scheduling of reprocessing can be made less dependent on the age of the sludge.

A still further object is to eliminate the loss of valuable high quality composition constituents which would otherwise be destroyed or used inefficiently in recovered coating compositions of very much lower quality.

These objects are accomplished by preserving and reprocessing overspray sludge by a combination of interdependent process steps consisting essentially of (1) placing in a closable storage vessel a water-bearing sludge containing the recovered overspray of an organic coating composition, the organic film-forming portion of which is completely soluble in a volatile organic solvent of the same character as the volatile organic solvent portion of the coating composition from which the overspray was derived, (2) adding to the sludge a volatile organic solvent for the film-forming portion of the overspray in sufficient amount to substantially prevent the formation of seed or gel therein until the sludge has been completely reprocessed, the film-forming portion being susceptible to the formation of seed or gel in the absence of the added solvent; (3) subsequently reclaiming the overspray in the sludge by separating therefrom substantially all of the water and by dissolving the overspray in a volatile organic solvent of the same character as that contained in the coating composition from which the overspray was derived. By this combination of process steps is obtained a reclaimed coating composition having protective and decorative properties substantially equal to those of the original coating composition from which the overspray was derived.

The following examples illustrate but do not limit the invention.

EXAMPLE I

A white baking-type synthetic enamel top coat for refrigerator cabinets was used in this example. It consisted essentially of titanium dioxide pigment uniformly ground or dispersed in a resinous film-forming material, the essential constituents of which were monohydric alcohol-modified urea formaldehyde resin and vegetable oil-modified glycerol phthalate alkyd resin. These resins were in solution in a mixture of butyl alcohol and volatile liquid hydrocarbons.

This coating composition was sprayed through conventional paint spraying equipment in a "water curtain" spray booth. The atomized spray dust or overspray was precipitated by the water and was carried to a reservoir where it accumulated as overspray sludge.

A sample of the sludge was found to still be soluble in an alcohol/hydrocarbon mixture of the same character as that contained in the original coating composition.

Six containers were filled about 90% full with water-bearing sludge skimmed from the reservoir. To two containers was added about 6%, by volume based on the sludge in the container, of butyl alcohol. To two others was added about 6%, on the same basis, of a mixture containing 20:80 by weight butyl alcohol:volatile liquid hydrocarbon. To the remaining two was added about 6% by volume of water. The contents were not agitated, but a long blade was inserted through the mass to the bottom of the container and moved back and forth once through the stiff sludge to produce a temporary core in which the liquid present could collect. The containers were closed, marked to identify the duplicates and separated into two sets—one set for storage at room temperature and the other set for an accelerated deterioration test at 120° F. Periodically, the containers were opened for inspection and testing to determine the condition of the sludge. The observations are recorded in Table I. In the table, "excellent" means that the sludge was still in substantially its original condition; it was soft, workable, soluble, and reclaimable to yield a product having protective and decorative properties substantially equal to the original coating composition. "Good" means that, except for a slight thickening, no important change had taken place. "Fair" means that some seed had developed or that considerable thickening or some gelation had occurred and that the product reclaimed therefrom would be expected by previous experience to be of inferior quality. "NG" means that a considerable amount of seed or gel had formed or that the sludge had deteriorated to a stringy semi-solid, in either of which conditions it could not be reclaimed to yield a product having properties substantially equal to the original coating composition.

Table
STABILITY OF OVERSPRAY SLUDGE

|  | Sludge and Butyl Alcohol | Sludge and Butyl Alcohol/ Hydrocarbon | Sludge and Water |
| --- | --- | --- | --- |
| Room Temperature Storage: |  |  |  |
| After 7 days | Excellent | Excellent | Good. |
| After 13 days | do | Good | do. |
| After 34 days | do | Fair | NG. |
| 120° F. Storage: |  |  |  |
| After 47 hours | do | Good | Fair (discontinued). |
| After 72 hours | do | Fair (discontinued). |  |
| After 97 hours | do |  |  |

The results of these tests show that the butyl alcohol, which is a solvent for the mixed resins in the overspray, keeps the sludge in excellent condition for at least 34 days. Although the butyl alcohol/hydrocarbon mixture, which is also a solvent for the mixed resins in the overspray, does not preserve the overspray in such good condition, it is considerably better than no solvent treatment at all, as represented by the water covered sample.

EXAMPLE II

Three 55-gallon drums were filled to about 90% of capacity with an overspray sludge having the same essential constituents as that of Example I. Three gallons of butyl alcohol were added to the first drum, three gallons of isopropyl alcohol to the second drum, and three gallons of water to the third drum. The drums were closed and stored outdoors in a plant yard for about 3 months of summer weather. Inspection after this period of storage showed that the sludge in the drums containing the butyl alcohol and isopropyl alcohol, respectively, was still in good condition. Both alcohols are solvents for the mixed resins in the sludge. The sludge containing added water was in relatively poor condition.

Samples from each drum were separately reprocessed by adding enough solvent to thin the overspray to an enamel-like consistency, then by distilling off substantially all of the water by azeotropic distillation under vacuum, and finally, by adding solvent to adjust the viscosity of the reclaimed enamel to substantially the same viscosity as the enamel from which the overspray had been collected. The resulting three enamels were tested for appearance, and a very slight seed was visible in the two derived from the drums containing butyl alcohol and isopropyl alcohol respectively. These two products were useful, alone or blended with new enamel of substantially the same composition, as first-quality enamels. Considerable seediness was observed in the enamel derived from the drum containing added water and this product was not useful as a first-quality enamel.

While the examples illustrate the improvements of this invention with respect to enamels containing urea-formaldehyde and alkyd resins, the same process is applicable to organic coating compositions containing other resinous film-formers such as oil modified alkyd resins alone, blends of such an alkyd resin with monohydric alcohol modified melamine formaldehyde resin, blends of such an alkyd resin with nitrocellulose, and the like, when the overspray collected from such a coating composition deteriorates in storage to a seedy, gelled, or insoluble state.

It will be obvious to those skilled in the coating composition art that the solvents shown in the examples are merely illustrative and that each different kind of overspray will respond to the process of this invention to a different degree with different solvents or combinations thereof and, further, that the choice of a particular solvent for optimum results will be governed not only by its physical and chemical characteristics but also by its availability, cost, convenience in handling, and other non-technical aspects.

The solvents added to preserve the sludge of a given type of overspray need not contain the same solvents as were used in the original coating composition, so long as the added solvent is of the same character as the original solvent, i. e. capable of producing a solution of the resinous components in the concentrations normally encountered in coating compositions, and is otherwise innocuous to the composition. For instance, ketones, esters, ethers, and chlorinated hydrocarbons are good solvents for many resins used in coating compositions; and they may be substituted, where desirable or necessary, for the previously mentioned alcohols and hydrocarbons.

The examples show the addition of about 6% of solvent based on the volume of the sludge. It is obvious that a smaller amount of a stronger solvent can be substituted for this 6% or, conversely, a larger amount of a weaker solvent. It is also obvious that there would be no advantage in adding a larger amount of solvent than that amount which is required in the completely processed reclaimed coating composition. The most practical and, therefore, the preferred amount of added solvent is between about 1% and about 10% by volume based on the volume of the sludge. It is preferable to add the preserving solvent to the overspray sludge at the time the sludge is removed from the bulk of the precipitating medium, but this is not essential. The solvent may be added at a later time provided the overspray has not yet deteriorated and is still soluble in a solvent of the same character as the solvent portion of the coating composition from which the overspray was derived.

Although the examples employ enamels pigmented with titanium dioxide, it is obvious that pigmentation forms no part of this invention and that coating compositions containing no pigment at all or containing pigments other than titanium dioxide are within the scope of the invention. Likewise, other conventional modifying agents such as plasticizers, inhibitors, driers, and the like, form no part of this invention and they may or may not be present, depending on the nature of the coating composition.

The azeotropic distillation method of separating water from the valuable portion of the sludge, as used in Example II, is only one of several water-removal methods. Other methods within the scope of this invention are decantation, solvent extraction, conventional distillation, and centrifugation.

In reclaiming overspray, complete removal of the water is usually not essential because the reclaimed coating composition usually will tolerate a water content up to the order of 2%–4%. Of course, if the overspray is recovered by emulsification in water, the water removal step is eliminated.

Although overspray sludge usually contains 5%–25% of water, such a concentration is not critical and merely represents the range commonly found in commercial overspray recovery processes.

From the foregoing complete description of this invention, it is seen that the process preserves the valuable constituents of excess sprayed coating composition, which has been collected as overspray sludge, in substantially their original condition for a period considerably longer than was heretofore possible. Thereby, the valuable constituents need not be reprocessed immediately in order to obtain a first-quality reclaimed product, but the reprocessing may be delayed and the deterioration of that overspray which would have occurred during the same period is prevented or considerably inhibited. The net result of these advantages is that substantially the entire volume of the original coating composition can ultimately be used for its original purpose, whereas heretofore some was lost for first-quality uses by deterioration of the collected overspray, or unnecessary cost was involved in minimizing the storage period to prevent deterioration.

It is apparent that many widely different embodiments of this invention can be made without departing from the spirit and scope thereof and, therefore, it is not intended to be limited except as defined in the appended claims.

I claim:

1. The process of reclaiming as a usable organic coating composition the collected overspray of a sprayed organic coating composition which comprises (1) placing in a closable storage vessel an aqueous sludge of the overspray of a coating composition, the organic film-forming portion of which is completely soluble in a volatile organic solvent of the same character as the volatile organic solvent portion of the coating composition from which the overspray was derived, (2) substantially preventing the formation of seed or gel therein until the sludge has been completely reprocessed by adding to the sludge at least 1%, based on the volume of the sludge, of a volatile organic solvent for the film-forming portion of the overspray, said film-forming portion being susceptible to the formation of seed or gel in the absence of said solvent, and (3) subsequently reclaiming the overspray in said sludge by separating therefrom substantially all of the water and by dissolving the overspray in a volatile organic solvent of the same character as the volatile organic solvent portion of the coating composition from which the overspray was derived.

2. In the process of reclaiming an organic coating composition, which process comprises (1) precipitating in an aqueous medium the overspray of a sprayed organic coating composition, said overspray in the form in which it is collected being susceptible to the formation of seed or gel therein when subjected to storage prior to the completion of said process, (2) collecting and storing an aqueous sludge containing said overspray in a closable vessel, (3) separating substantially all of the water from said sludge, and (4) dissolving said overspray in a volatile organic solvent of the same character as the volatile organic solvent portion of the coating composition from which said overspray was derived; the improvement which comprises substantially preventing the formation of seed or gel in said overspray until said process is completed by adding to the vessel containing said sludge, at the time said sludge is collected therein, at least 1%, based on the volume of the sludge, of a volatile organic solvent for the resinous film-forming portion of said overspray.

3. The process of producing a reclaimed coating composition from the overspray of a sprayed organic coating composition, the liquid organic portion of which consists essentially of a solution of monohydric alcohol-modified urea-formaldehyde resin and vegetable oil-modified alkyd resin in butyl alcohol and volatile liquid hydrocarbons which process comprises (1) placing in a closable storage vessel an aqueous sludge of said overspray, the resinous portion of which is soluble in a volatile organic solvent of the same character as the volatile organic solvent portion of the sprayed coating composition and is susceptible to the formation of seed or gel during prolonged storage, (2) adding to the sludge in said vessel a volatile organic solvent selected from the class consisting of butyl alcohol, isopropyl alcohol, liquid hydrocarbons, and mixtures thereof, in the amount of about 6% by volume of the sludge to prevent the formation of seed or gel until said reclaimed coating composition has been produced, (3) separating substantially all of the water from said sludge, and (4) dissolving said overspray in a volatile organic solvent of the same character as the volatile organic solvent portion of the sprayed coating composition, by which steps is produced a reclaimed coating composition having protective and decorative properties substantially equal to those of the sprayed coated composition.

4. The process of claim 1 in which the volatile organic solvent added is in the amount of 1 to 10% by volume based on the volume of the sludge to which it is added.

5. The process of claim 2 in which the volatile organic solvent added is in the amount of 1 to 10% by volume based on the volume of the sludge to which it is added.

References Cited in the file of this patent

UNITED STATES PATENTS

| 2,064,876 | Bender | Dec. 22, 1936 |
| 2,086,514 | Saunders | July 6, 1937 |
| 2,315,125 | Meckler | Mar. 30, 1943 |